Figure 1:
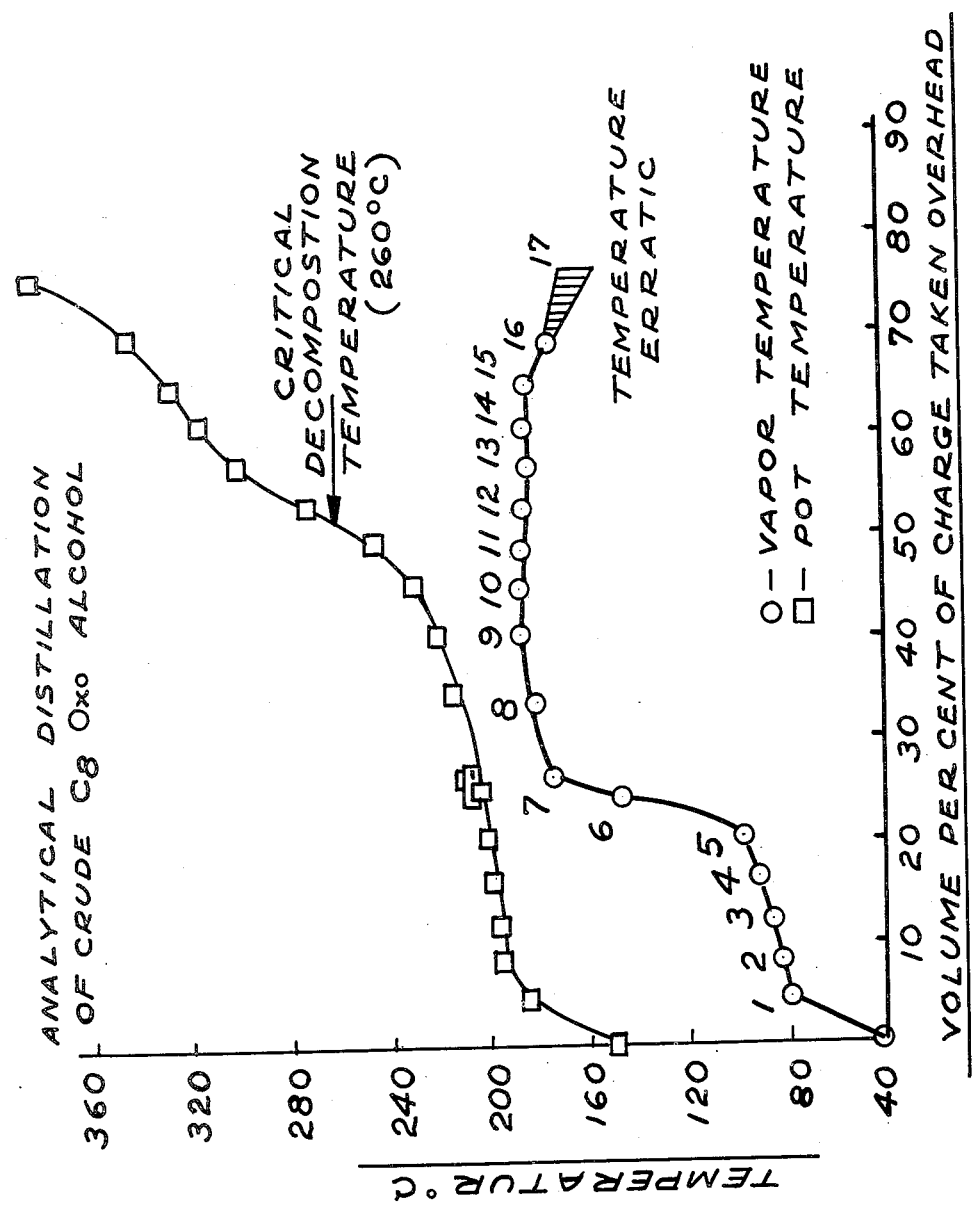

Joseph K. Mertzweiler Inventor
By Henry Berk Attorney

UNITED STATES PATENT OFFICE 2,614,128

CONTROLLED DISTILLATION OF OXO ALCOHOLS CONTAINING HIGH-BOILING IMPURITIES

Joseph K. Mertzweiller, Baton Rouge, La., assignor to Standard Oil Development Company, a corporation of Delaware Application December 31, 1949, Serial No. 136,295

2 Claims. (Cl. 260—643)

This invention relates to an improved distillation process for purification of crude alcohols and more specifically, to a method for purifying higher boiling Oxo alcohols which contain impurities of the type sensitive to excessive temperatures and tending to undergo decomposition at temperatures above the normal boiling point of the alcohol or alcohols being purified.

It has been found advantageous to avoid the excessively high temperatures which normally are necessary during the distillation of iso-octyl alcohol, since such temperatures cause cracking and decomposition and consequent contamination of the alcohol. Instead of operating the column at such temperatures as to recover substantially all the alcohol, it is of great advantage from an alcohol quality standpoint, to control the alcohol product distillation to reject a portion of the alcohol in the feed as bottoms, and subsequently recover this portion of alcohol; for instance, by steam stripping. This portion can, if desired, be recycled to the hydrogenation stage for utilization.

Co-pending U. S. application Serial No. 136,281, filed December 31, 1949, discloses a method for the purification of Oxo alcohols which comprises distilling the topped alcohol at reduced pressures below certain critical temperatures. Co-pending U. S. application Serial No. 135,784, filed December 29, 1949, utilizes the presence of a thermally stable liquid which does not azeotrope with the alcohol in the purification by distillation of synthetic Oxo alcohols.

Many alcohols which are of great commercial importance are prepared by synthetic processes and especially by the so-called Oxo reaction. The term "Oxo reaction" is a general term used to describe the preparation of oxygenated organic compounds by the reaction of carbon monoxide and hydrogen with olefinic hydrocarbons in the presence of a carbonylation catalyst. The method is used particularly for the manufacture of various primary alcohols, more specifically octyl alcohols, by operations involving interaction of carbon monoxide, hydrogen, a hydrocarbon mixture containing substantial amounts of heptenes, and a cobalt carbonylation catalyst to form octyl aldehydes, and subsequent reduction of these aldehydes by catalytic hydrogenation to a mixture relatively high in alcohols.

Primary alcohols of this general type are of great economic importance and interest because of their use as intermediates in the manufacture of plasticizers of the di-ester type. These alcohols have previously been supplied mainly by such comparatively costly procedures as aldol condensation of butyraldehydes, followed by dehydration, and hydrogenation of the resulting unsaturated octyl aldehyde. The Oxo reaction and subsequent hydrogenation have been found to comprise a highly economical and valuable method for manufacturing alcohols from cheap and readily available hydrocarbon material chiefly of petroleum origin.

In the carbonylation stage of the process, a large number of different types of reaction take place to form a variety of products. The primary reaction products will be aldehydes. These aldehydes themselves can undergo further reactions to yield other products. For instance, the aldehydes condense with each other to yield aldols. At least a part of the aldols undergo dehydration to alpha-beta-unsaturated aldehydes. Some ketones are also formed under the reaction conditions. A part of the aldehydes formed in the reaction zone are hydrogenated to alcohols and the alcohols so formed react with aldehydes and ketones present to give mixtures of acetals, hemi-acetals, and ketals. These compounds can undergo further reactions, including dehydration, to give ethers, particularly those of the unsaturated types. The alcohols can esterify the acids present to give esters. Hydrogenation of a part of the olefin starting feed stock, as well as some deoxygenation of oxygenated intermediates, gives some hydrocarbons in the final Oxo product. In addition, other more complex and less known reactions also occur between the various intermediates and products obtained, thereby yielding a mixture of higher boiling impurities and contaminants of the oxygenated type.

In the hydrogenation stage, the mixtures of acids, saturated and unsaturated aldehydes, alcohols, ethers, aldol condensation products, glycols, acetals, ketals and esters are hydrogenated in the presence of a suitable catalyst to yield more saturated products containing a higher percentage of alcohols and non-olefinic compounds. Some of these impurities, especially the unsaturated ethers, acetals, ketals, aldols and esters, are quite unstable toward heat and are sensitive generally to high temperature conditions. For instance, in general, the aldols, acetals, hemi-acetals and ketals have a great tendency to undergo degradative decomposition reactions whenever the alcohol is subjected to a simple distillation. In many cases, thermally unstable esters are present in the high boiling Oxo products, and these too undergo both thermal and hydrolytic decompositions under ordinary distillation conditions.

A mechanism which appears to fit the facts in a general fashion may be formulated in which it is assumed that decomposition reactions of various thermally and hydrolytically unstable materials proceed to an appreciable extent at the distillation temperature of the alcohol being purified, in this particular case, the iso-octyl alcohol which has a boiling point about 375° F. at atmospheric pressure. The decomposition reactions occurring usually produce water, especially by aldol dehydration, and this water probably contributes further to decomposition reactions by its hydrolytic action, especially on esters, ketals, acetals and unsaturated ethers. The more volatile of the decomposition products, including various saturated and unsaturated aldehydes, water, and alcohols (including both iso-octyl and other alcohols of lower boiling point), go overhead with the alcohol product and contaminate the latter. Any aldehydes which are, in general, quite volatile, are distilled over with the alcohol fraction in this manner and can subsequently combine very readily with the distilled alcohol product, reforming acetals and hemi-acetals, which are likewise subject to a second decomposition process when a redistillation of the alcohol fraction is attempted. Furthermore, aldehyde and other decomposition products are objectionable because they lower overall product purity and, due to instability, cause difficulties in the use of the alcohol. It is believed, however, that this is an oversimplified and incomplete picture of the overall situation.

It can readily be seen that it is difficult, if not impossible, to obtain relatively complete recovery of the Oxo alcohol by a distillation step and at the same time, to avoid contaminating the alcohol product by degradative and thermal decomposition of the higher boiling impurities present in the alcohol.

Perhaps the most important commercial use for these higher molecular weight alcohols, such as the $C_8$ iso-octyl alcohols produced by the Oxo reaction, is in esterification reactions to form compounds of the diester type for use as plasticizers in reasin and plastic compositions. Those of the phthalate and adipate type are widely manufactured. Even though an alcohol product of a synthetic source appears to be colorless, it frequently contains small amounts of impurities which form colored bodies during the subsequent acid-alcohol reaction. These colored materials are difficult to remove from the resulting high boiling ester products and result in inferior esters which require additional and excessive purification prior to their use as plasticizers. The formation of color in the ester products appears to be especially pronounced when the esterification is done in metallic, and, in particular, stainless steel reactors.

Since the alcohols are to be used principally in the preparation of plasticizer esters, the color and general purity qualities are best determined by a study of the ester produced from the alcohol. In typical alcohol esterification operations, a 20% molal excess of Oxo alcohol is used based on the phthalic anhydride used, that is, about 2.4 moles of alcohol per mole of phthalic anhydride. The esterification reaction is carried to substantial completion by esterification for a sufficient time. The unreacted alcohol is then stripped off from the ester product, preferably under reduced pressure, and blended with fresh alcohol for returning to the esterification zone. Thus, undesirable color-forming materials have the opportunity to build up during the recycle stages to a point at which they must be purged from the system before continuing the recycling operation. This presents impurity problems when even small amounts of impurties consistently exist in the alcohol.

To obtain the data on comparative ester Hazen colors, esterification reactions were carried out during a period of two hours at the boiling point of the mixture. The crude esterification mixture was then cooled and compared with Hazen color standards. A complete description of the standard Hazen ester color test is found in A. S. T. M. P-268-46.

This same type of problem of unstable impurities also exists in connection with other alcohols made by the Oxo reaction and is particularly troublesome for the higher boiling water-immiscible alcohols of the range of $C_4$ to $C_{15}$ or higher. For example, the $C_9$ alcohols, prepared by the reaction of $C_8$ olefins such as diisobutylene with carbon monoxide and hydrogen may be purified in the same manner as that described herein for the purification of the $C_8$ Oxo alcohols.

It can thus be seen that it is of great desirability to obtain the distilled alcohol products, particularly those of the type obtainable from synthetic processes, such as the Oxo process, substantially free of aldehydes, acetals and other chemically reactive and unstable substances when the alcohols are intended for use as chemical reactants. This is especially true if the esters are to be used as esterification agents to make plasticizers.

A novel improved distillation procedure has been discovered by which the Oxo alcohols can be distilled to yield products of relatively high purity, the difficulties caused by contamination with cracked by-products of the heavy polymeric bottoms being avoided.

This purification process can be successfully used for distillation of alcohols containing thermally unstable high boiling impurities obtained from any source, and is especially applicable to treatment of alcohols having from 4 to 15 carbon atoms. It finds particular application in purification of alcohols obtained by the so-called Oxo reaction mentioned above and is especially useful for distilling alcohols of the $C_8$ and $C_9$ class, although the process can also be applied advantageously for other alcohols containing similar types of thermally unstable impurities, particularly alcohols obtained by hydrogenation of carbonyl compounds.

A typical $C_8$ crude Oxo alcohol mixture such as can be employed as starting feed in this improved distillation process has the following composition:

| | Weight per cent |
|---|---|
| Alcohol as $C_8$ | 65.0 |
| Aldehyde as $C_8$ | 1.8 |
| Acetal as $C_{24}$ | 3.7 |
| Ester as $C_9$ | 3.0 |
| Unsaturates as $C_7$ | 6.3 |
| Acid as $C_8$ | 0.1 |
| Water | 2.0 |
| Saturates and unknowns | 18.1 |

Analytical distillation of the crude $C_8$ Oxo alcohols from the hydrogenation step following carbonylation of a $C_7$ polymer olefin clearly shows that the impurities exhibit thermal sensitivity in that they appear to decompose at temperatures of about 260° C. Figure 1 is a graph showing a plot of data obtained from a batch analytical distillation of a crude C₈ Oxo alcohol. The heavy ends region starting about 260° C. bottoms temperature shows evidence of considerable undesirable cracking, even though there is a considerable amount of C₈ Oxo alcohol remaining in the bottoms residue. While there does not appear to be any one exact critical temperature for cracking, since the extent of decomposition is dependent on the time of high temperature exposure as well as on the temperature, it appears that if a "pot" or bottoms temperature of 260° C. (500° F.) exists for an appreciable time interval, there is extensive decomposition of the heat-sensitive bottoms and undesirable contamination of the alcohol removed as an overhead stream. Some decomposition occurs prior to this temperature, and, in fact, occurs prior to recovery of the Oxo alcohol, starting at the temperature point which exceeds the boiling point of the alcohol, in this case the iso-octyl alcohol boiling around 175°–185° C. The vapor and pot temperatures have been plotted on the same graph with an indication of the temperature values at which sample cuts were removed for testing. The plot of the pot temperature indicates a sharp rise in temperature at about 260° C., showing cracking has begun when about 51 volume percent of the charge has passed overhead. Table I below shows data obtained in color determination tests carried out on the cuts removed from the analytical distillation.

largely of the higher boiling bottoms product, but containing a sufficient amount of the lower boiling alcohol to keep the bottoms temperature relatively low and below the cracking temperature. The amount of the alcohol allowed to remain in the bottoms is not critical but should be sufficient to effectively maintain lower temperatures in the fractionating tower bottoms. An amount of from 5% to 20%, based on the total alcohol present in the initial feed, is adequate for temperature control although up to 50% of the alcohol can be rejected. For economy purposes, the amount used should be that which is low enough to do the proper job effectively. Thus, from 95% to 80% of the alcohol can be removed, and from 5% to 20% rejected with the bottoms.

It is further a preferred embodiment of this invention that the Oxo alcohol which is allowed to remain in the bottoms is recovered by transferring the bottoms containing the residual alcohol to a still, preferably a steam stripper, and recovering therein the alcohol for recycle to the hydrogenation stage of the Oxo reaction to undergo rehydrogenation.

It is considered that the improvements obtained by the use of this improved mode of distillation may be achieved by applying this process in any type of operation wherein an Oxo alcohol or any alcohol containing high boiling impurities sensitive to thermal decomposition is subjected to a distillation.

TABLE I

| Cut | 6 | 7 | 8 | 9 | 10 | 11 | 12 | 13 | 14 |
|---|---|---|---|---|---|---|---|---|---|
| Ultraviolet Absorption at 2500 Å | 2.000 | 1.475 | 0.242 | 0.191 | 0.230 | 0.210 | 0.316 | 0.955 | 1.800 |
| Alcohol Hazen No | 50 | 180 | <25 | <25 | <25 | <25 | 30 | 150 | 150 |
| Ester Hazen No | 220 | 520 | 240 | 120 | 195 | 220 | 320 | 460 | 500 |

Since ester color is considered to be extremely critical and is perhaps the most important quality factor in determining the usefulness of the Oxo alcohols to prepare ester plasticizers, the above data in Table I are very important in that they clearly show that certain of distilled cuts of Oxo alcohol are clearly superior to other cuts. Thus, the cuts numbered 8 to 11 are superior as to this very critical quality to cuts 12 to 14 which were obtained, as shown in the graph of Figure 1, after the pot temperature had risen to and above the critical decomposition point of 260° C., the temperature at which the higher boiling Oxo alcohol impurities start to undergo thermal cracking and degradation as is shown by the high ester Hazen number in Table I for these cuts.

In order to avoid the difficulties inherent in recovering the major portion of alcohol, but in an impure state contaminated by color-forming impurities produced by the cracking of the bottoms, it has been found highly effective to permit a substantial portion of the alcohol undergoing distillation to remain in the bottoms and recover this quantity later.

For instance, in distilling a crude iso-octyl alcohol from the Oxo reaction it is convenient to allow from 5% to 10% of the Oxo alcohol to remain behind as bottoms product, and recover this quantity of alcohol in a separate distillation zone. There is thus obtained a much purer alcohol product from the initial distillation, since this alcohol product will be relatively uncontaminated by volatile decomposition products of the bottoms, which are made up of high boiling ethers, esters, acetals, and hemi-acetals.

The effect on the distillation is to have a bottoms fraction from the alcohol still composed Examples including a specific embodiment of this improved process are presented herewith, although it is to be understood that the invention may be practiced in other ways which will be apparent to those skilled in the art.

*Example I*

Figure 2:
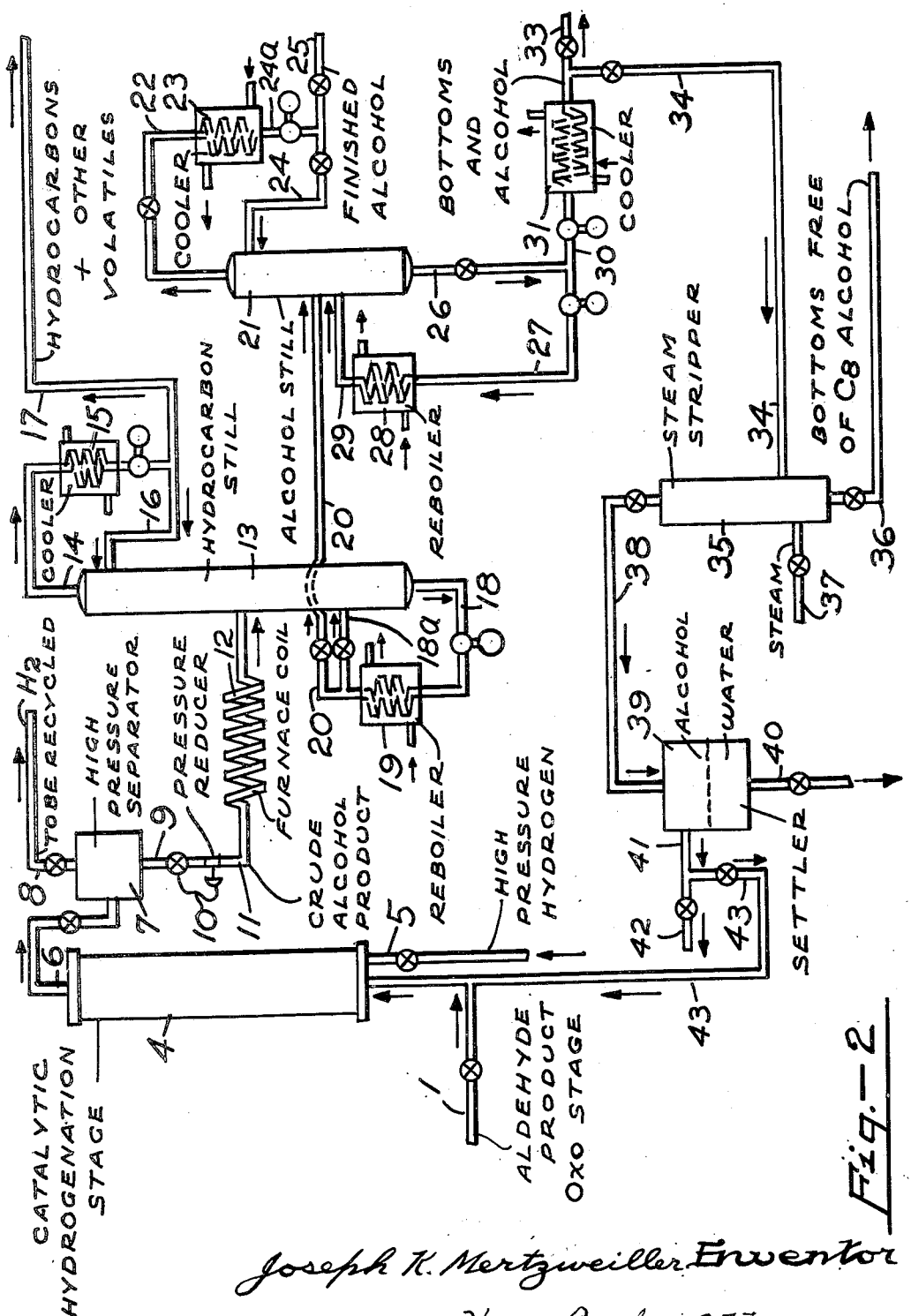

This example can best be understood by reading it in conjunction with Figure 2 which is a diagrammatic showing of the process. An olefin feed consisting substantially of a C₇ olefin stream, is subjected to the oxonation reaction by contact with carbon monoxide and hydrogen under suitable conditions of temperature and pressure and in the presence of a suitable catalyst, to give an aldehyde product which is passed by lines 1 and 2 to a catalytic hydrogenation stage, wherein the said Oxo aldehyde product is hydrogenated with high pressure H₂, introduced via line 5, to C₈ Oxo alcohols together with higher boiling impurities such as ethers, esters, and acetals. This mixed alcohol and by-products mixture is passed via line 6 to a high pressure separator 7, wherein H₂ is separated by line 8 to be recycled and the crude alcohol product passes by line 9 through pressure reducer 10 and line 11, to preheater furnace coil 12. The heated alcohol is introduced into the hydrocarbon still or topping tower 13 at an intermediate point. Overhead, by line 14, there is removed a vapor stream of hydrocarbons and volatiles which boil above the alcohol. This stream is passed through cooler or condenser 15 and a portion recycled as reflux through line 16, back to column 13. The remainder is removed by line 17.

The alcohols and higher boiling impurities are removed through line 18. A part of the alcohol stream in line 18 is recycled back to the tower by lines 18 and 18A and through external heater 19 to supply heat for the tower. The remainder of the alcohol and high boiling impurities obtained as bottoms in line 18 is passed to an intermediate point of alcohol distillation tower, or finishing tower 21. Overhead, from distillation tower 21, there is removed a pure $C_8$ alcohol vapor fraction by line 22. This alcohol is condensed in cooler-condenser 23 and a liquid stream removed by line 24A. A part of this stream is recycled back to the distillation tower 21 by line 24 as reflux and a major portion is recovered as finished $C_8$ Oxo alcohol. This $C_8$ alcohol fraction is relatively free of color-forming impurities because of the presence of the $C_8$ alcohol remaining in the bottoms product as a temperature control device.

Alcohol still 21 is operated so as to recover overhead only about 50 volume percent, although up to 70 or 80 volume percent of the total feed may actually be the desired $C_8$ Oxo alcohol. This control can be maintained by rejecting, with the bottoms, all material remaining in the still after the pot temperature reaches 260° C. The recycling of recovered alcohol is especially useful if it is desired to introduce conveniently small quantities of $H_2O$ into the hydrogenation.

This material permits the temperature operation of distillation tower 21 to be kept lower, especially as to bottoms temperature. Thus, the bottoms temperature does not substantially exceed 260° C., the critical decomposition temperature of the thermal sensitive impurities as shown by Figure 1. From the lower part of the tower 21 by line 26, a stream of bottoms plus the rejected alcohol is removed. A part of this stream is recycled by lines 27 and 29 through outside heater 28 back to the tower 21 to supply heat. The remainder of the mixture is passed through line 34 to an intermediate portion of a recovery tower. This is steam stripper 35. Steam is injected by line 37 into a lower part of the tower 35. Overhead, from tower 35 there is removed an aqueous vapor stream of $C_8$ alcohol which is passed to a settler or phase separator 39, from which there emerges from the lower part through line 40, a stream of $H_2O$ to discard. A fraction of $C_8$ alcohol is obtained from the upper portion of settler 39, a stream of relatively pure $C_8$ alcohol, which may be removed if desired by lines 41 and 42, or may be recycled to the hydrogenation stage 4, by lines 41, 43, and 44. The recycling of recovered alcohol is especially useful if it is desired to introduce conveniently small quantities of $H_2O$ into the hydrogenation.

*Example II*

This example is designed to illustrate the effects obtained when the esterifications are carried out in the presence of stainless steel and the extent to which the technique described may improve the color of the resulting ester.

In order to test the effectiveness of a treatment for Oxo alcohol products, it has been found that accelerated tests can be carried out which simulate the conditions present during large scale commercial esterifications. This test consists in carrying out the esterification for a suitable time and at the required temperatures in the presence of certain types of metallic strips, the standard esterifications being done in glass type reactors. There is a correlation between colors developed in commercial esterifications and colors developed in esterifications in which these metallic strips are present. In the data obtained from the tests, the color developed in the esterification is measured in the product as the absorbency at 447 mu. An absorbency of 0.10 or less is considered to indicate an alcohol of satisfactory quality.

A 3000 ml. sample of hydrogenated plant product was distilled, employing a 25 mm. Podbielniak column at 5:1 reflux ratio. The temperature, yield, and color data are summarized as follows in Table II.

TABLE II

| Cut No. | Temperature Range, °F. Vapor | Temperature Range, °F. Liquid | Vol. Percent of Charge | Ester Color Absorbency, 447 mu [1] |
|---|---|---|---|---|
| 1 | 117–215 | 215–370 | 19.66 | |
| 2 | 216–265 | 371–375 | 2.00 | |
| 3 | 266–350 | 376–378 | 1.67 | |
| 4 | 351–360 | 379–382 | 6.66 | 0.09 |
| 5 | 361–362 | 383 | 6.66 | 0.08 |
| 6 | 363–364 | 384–385 | 6.66 | 0.10 |
| 7 | 365–367 | 386–390 | 6.66 | 0.12 |
| 8 | 367–369 | 390–397 | 6.66 | 0.13 |
| 9 | 370–371 | 397–405 | 6.66 | 0.13 |
| 10 | 372 | 406–417 | 6.66 | 0.13 |
| 11 | 373–374 | 418–455 | 6.66 | 0.11 |
| 12 | 375 | 456–505 | 3.33 | |
| 13 | 376–390 | 506–578 | 3.33 | |
| 14 | 391–500 | 579–610 | 3.33 | |
| 15 | 501–505 | 611–615 | 0.66 | |

[1] Absorbency of esterification mixture of 75 ml. alcohol, 25 gms. phthalic anhydride, and 1.0 gm. AISI-304 steel chips refluxed for two hours, moisture being continuously removed. An absorbency of 0.10 or less is considered satisfactory quality.

It can thus be seen that as the boiling range of vapor and liquid increases during the distillation, the color data show increasingly inferior color quality of ester obtained from the alcohol fractions.

Fractions 4 through 15 were blended in proportionate ratios to give composite alcohol fractions representing various yields, alcohol purities (as $C_8$) and quality as determined by ester color. These data are shown in Table III below.

TABLE III

| Composite Cuts | Alcohol Yield, Vol. percent of Charge | Alcohol Purity, percent as $C_8$ | Ester Color Absorbency 447 mu |
|---|---|---|---|
| 4 through 12 | 56.61 | 100.0 | 0.09 |
| 4 through 13 | 59.94 | 99.5 | 0.11 |
| 4 through 14 | 63.27 | 95.1 | 0.17 |
| 4 through 15 | 63.93 | 93.7 | 0.22 |

Thus it can be seen that if fractions obtained at the higher boiling ranges are added to the good quality alcohol, increased color is noted in esters prepared therefrom.

A mixture of composite cuts 11 through 14 above was hydrogenated in iso-octane as a solvent over a molybdenum sulfide on charcoal catalyst similar to that used in the original hydrogenation to produce the alcohol. This hydrogenation was carried out in a shaker autoclave at 400° F. for 3 hours with 2800 lbs. of hydrogen pressure and 15% catalyst. The solvent was removed by distillation and the alcohol recovered was about 90% of the charge. This alcohol was blended in proportion with cuts 4 through 10 and showed an ester color of 0.11; the blend would correspond to a yield of 62.93 volume per cent of the charge. This blend is shown to possess a lower color than a blend representing approximately the same yield but without the recycle hydrogenation.

What is claimed is:

1. An improved continuous distillation process for the purification of an impure primary $C_8$ iso-octyl alcohol obtained by the Oxo process of the catalytic reaction of a $C_7$ olefin stream with carbon monoxide and hydrogen and subsequent hydrogenation of the $C_8$ aldehydes obtained therefrom, and containing high-boiling thermally unstable impurities including acetals, esters, hemiacetals, and ethers, which comprises introducing the impure alcohol into an alcohol distillation zone, maintaining continuous reflux within said zone, removing an alcohol rich overhead vapor stream from said distillation zone, maintaining the temperature of the liquid bottoms below 260° C., but at a minimum temperature of 175° C. to retain as bottoms from 5 to 10% of the alcohol present in the impure alcohol fed to the distillation zone, whereby the decomposition of the high-boiling thermally unstable impurities is prevented, removing a liquid bottoms product containing the retained alcohol and thereafter steam stripping the residual alcohol from the high-boiling impurities in the bottoms product and returning said recovered alcohol to the aldehyde hydrogenation for rehydrogenation.

2. An improved continuous distillation process for the purification of a mixture of impure primary $C_8$ iso-octyl alcohols obtained by the Oxo process of the catalytic reaction of a $C_7$ olefin stream with carbon monoxide and hydrogen and subsequent hydrogenation of the $C_8$ aldehydes obtained therefrom, and containing high-boiling thermally unstable impurities including acetals, esters, hemiacetals, and ethers, which comprises introducing the mixture of alcohols into a distillation zone, removing an alcohol-rich overhead vapor stream from said distillation zone, maintaining the temperature of the bottoms in the distillation zone at a minimum temperature of 175° C. and below 260° C. to retain as bottoms from 5% to 10% of the alcohols present in the impure alcohols fed to the distillation zone, whereby the decomposition of the high-boiling thermally unstable impurities is prevented, removing a liquid bottoms product containing the retained alcohols from the distillation zone, and thereafter recovering the retained alcohols from the high-boiling impurities in said bottoms product.

JOSEPH K. MERTZWEILLER.

REFERENCES CITED

The following references are of record in the file of this patent:

UNITED STATES PATENTS

| Number | Name | Date |
| --- | --- | --- |
| 1,835,571 | Merley | Dec. 8, 1931 |
| 2,509,878 | Owen | May 30, 1950 |